US011983679B2

(12) United States Patent
Cannata et al.

(10) Patent No.: US 11,983,679 B2
(45) Date of Patent: May 14, 2024

(54) SYSTEM AND METHOD FOR COLLECTING AND PROCESSING GLASS

(71) Applicant: Y.E.S. S.R.L. YOUNG ECOLOGY SOCIETY, Rome (IT)

(72) Inventors: Giovanni Cannata, Rome (IT); Gianfranco Raimondi, Rome (IT)

(73) Assignee: ECO SISTEM SAN FELICE S.R.L., Naples (IT)

(*) Notice: Subject to any disclaimer, the term of this patent is extended or adjusted under 35 U.S.C. 154(b) by 1247 days.

(21) Appl. No.: 16/603,945

(22) PCT Filed: Apr. 10, 2018

(86) PCT No.: PCT/IB2018/052492
§ 371 (c)(1),
(2) Date: Oct. 9, 2019

(87) PCT Pub. No.: WO2018/189668
PCT Pub. Date: Oct. 18, 2018

(65) Prior Publication Data

US 2020/0118087 A1 Apr. 16, 2020

(30) Foreign Application Priority Data

Apr. 12, 2017 (IT) ........................ 102017000040821

(51) Int. Cl.
*G06Q 10/30* (2023.01)
*B65F 1/14* (2006.01)
(Continued)

(52) U.S. Cl.
CPC ............... *G06Q 10/30* (2013.01); *B65F 1/14* (2013.01); *G01G 19/021* (2013.01); *G06Q 10/08* (2013.01);
(Continued)

(58) Field of Classification Search
CPC ........ G06Q 10/30; G06Q 50/26; G06Q 50/28; B65F 1/14; B65F 2210/128;
(Continued)

(56) References Cited

U.S. PATENT DOCUMENTS 6,643,718 B1 * 11/2003 Chen ........................ G06F 9/522 710/52
2002/0000178 A1 * 1/2002 Greco ...................... C09D 7/69 106/484

(Continued)

FOREIGN PATENT DOCUMENTS

| | | | |
|---|---|---|---|
| EP | 1477430 | A1 | 11/2004 |
| EP | 1818281 | A1 | 8/2007 |
| GB | 2508209 | A | 5/2014 |

OTHER PUBLICATIONS

Kinobe, Joel R., et al. "Reverse logistics system and recycling potential at a landfill: A case study from Kampala City." Waste Management 42 (2015): 82-92. (Year: 2015).*

(Continued)

*Primary Examiner* — Carrie S Gilkey
(74) *Attorney, Agent, or Firm* — NIXON & VANDERHYE

(57) ABSTRACT

Disclosed is a method of virtualizing access queues to machines for glass collection distributed throughout a territory. The distinction of management of requests for unloading full containers is based on the configuration of: the machine; the central server, remotely controlling queue management; the plant using glass coming from the collection to process it; and a fleet of trucks executing collection, following a path suggested by the data bank residing on the central server. In the method, the control center monitors availability of crushed glass at the machines, and demands for glass of a particular type by each production plant. If an emptying request arrives from a machine where one or more
(Continued)

glass containment cells is filled, the control center reprocesses the updated paths for the fleet of trucks or transport vehicles and for unloading from the machine to the truck based on the contingent requests from each production plant.

19 Claims, 4 Drawing Sheets

(51) Int. Cl.

*G01G 19/02* (2006.01)
*G06Q 10/08* (2023.01)
*G06Q 50/26* (2012.01)

(52) U.S. Cl.

CPC ........ *G06Q 50/26* (2013.01); *B65F 2210/128* (2013.01); *B65F 2210/144* (2013.01); *B65F 2210/184* (2013.01); *B65F 2240/1123* (2013.01); *Y02W 30/60* (2015.05)

(58) Field of Classification Search

CPC .......... B65F 2210/144; B65F 2210/184; B65F 2240/1123; G01G 19/021; Y02W 30/60
See application file for complete search history.

(56) References Cited

U.S. PATENT DOCUMENTS

| | | | | |
|---|---|---|---|---|
| 2002/0091595 A1* | 7/2002 | Itoi | G06Q 30/06 | 705/28 |
| 2008/0319698 A1* | 12/2008 | Chen | G01G 19/12 | 702/101 |
| 2016/0379154 A1* | 12/2016 | Rodoni | G06Q 10/063114 | 705/7.15 |

OTHER PUBLICATIONS

International Search Report, dated Jun. 6, 2018, from corresponding PCT application No. PCT/IB2018/052492.
Written Opinion, dated Jun. 6, 2018, from corresponding PCT application No. PCT/IB2018/052492.

* cited by examiner

SYSTEM AND METHOD FOR COLLECTING AND PROCESSING GLASS

FIELD OF THE ART

The present invention pertains to the field of apparatuses and techniques for recycling waste through the collection and processing of glass, in particular it refers to procedures for the collection and processing of hollow glass such as bottles, containers or packages, in general made of glass.

PRIOR ART

In the context of waste management, by “glass collection” it is intended the set of strategies and methods aimed to recover glass from waste, so as to reuse it rather than dispose of it in dumps.

Drinking bottles were for the first time recycled with reimbursable deposit by some beverage producers in Great Britain and Ireland around 1800—in particular the famous brand Schweppes. An official recycling system with reimbursable deposits for bottles and cans was established in Sweden in 1884.

The recycling of glass, along with paper and metals, has contributed to considerable savings of energy in the creation of new material.

The recovery of glass is a key concept in the modern treatment of discards and an essential component in the most correct and advanced waste management, and is also a solid source of potential business for investors in the field.

In addition, more generally, upstream of the recycling and separate waste collection, the subject of waste prevention, together with the social responsibility of the producers and a set of laws aimed to reduce packaging, also takes on importance.

It is known that recycling is more complex than the simple disposal in dumps or incinerators—which is not replaced, rather the use thereof is limited. One speaks of “recycling system”, referring to the entire production process and not only to the final step; this involves the use of recyclable materials such as glass, avoiding the materials that are more difficult or impossible to recycle.

The object of the present invention is to provide an apparatus for the volumetric reduction of glass packages obtained by means of the use of a dedicated glass crusher machine, first of all for uses of the HORECA sector, where glass packaging is most used, in order to then be distributed in ecological disposal areas, condominiums, hospitals, ships, . . . .

A further object of the present invention is to provide a machine that has reduced bulk and is provided with directional wheels. Its appearance is subjected to numerous versions and/or variants that configure multiple applications thereof; in the current case, the machine will be contained, entirely and/or in part, in pre-molded forms of various type, for example depicting bottles of various type, demijohns and/or similar products such to allow the use thereof in public places. Such versions are provided with multiple containers mounted on a “carousel” so as to allow more space for the glass storage, and a remote control for management of the machine, connected to a SIM, will notify the collection station so that it provides, over time, for the replacement of the full trash containers.

With regard to one aspect of the finding, the problem is analyzed relative to the transmission of geolocation data of a plurality of client units active in the recycling system, in which it is provided that the detections are automatically collected by a central server. These are then retransmitted as geolocation data towards a further plurality of client units (i.e. the trucks charged with the collection), upon reception by the central server unit of a proximity map—with relative paths—of the sites at which the collection of glass is carried out.

Indeed, the problems relative to the transportation networks are known, regarding the delays that occur based on the travel route selection. Among the most considerable problems—for the solution of which graphical representations are employed—there are the problems of searching for routes with predetermined characteristics.

For example, if a transportation network is given with four junctions and five road segments, weighted on the road segments with corresponding weights, a trip requires a time unit (e.g. 10 minutes) on each road segment and more than one trip on each road segment can be carried out in each time unit; a weight is then established corresponding to the times necessary for the path to be followed: the verification that is usually required is to establish if it is possible to transfer any one good from the junction 1 of the network to the junction 4, within a certain number of time units.

A network is termed minimum if the route for connecting all the junctions has the smallest possible length. Once a set of points is fixed in the plane, a network that connects them is any one graph that contains those points among its junctions. The object of the invention is also that of establishing the techniques for being able to minimize such paths—that each truck in charge of the collection must follow—and then find the so-called minimum travel based on a series of predetermined characteristics. Among these characteristics, the possibility of following optimized paths for the collection of glass with particular characteristics (color, grain size, . . . ) must be underlined.

The abovementioned objectives are obtained by means of the new automated selection procedures, as stated in claim 1.

BRIEF DESCRIPTION OF THE DRAWINGS

In order to better clarify the invention and without wishing to limit the scope thereof and the fields where it can be applied, several particular embodiments will be described hereinbelow, with particular reference also to the enclosed drawings. In such drawings.

Further particular characteristics of the preferred embodiments of the present invention will be described hereinbelow as a non-limiting example.

DETAILED DESCRIPTION OF THE INVENTION

Figure 1:
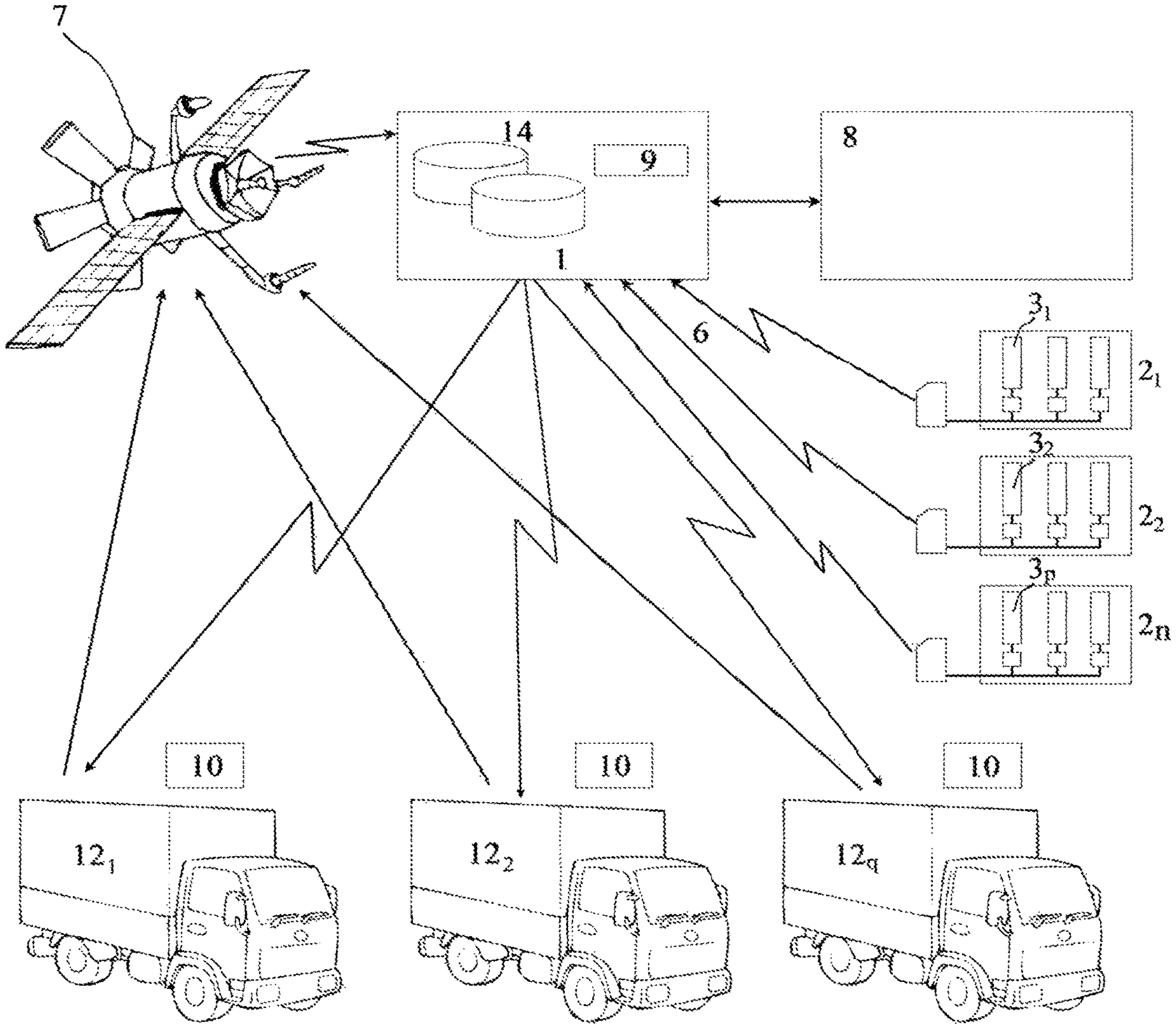
FIG. 1 is a general schematic representation, through a functional block diagram, of a system according to the present invention.
Figure 5:
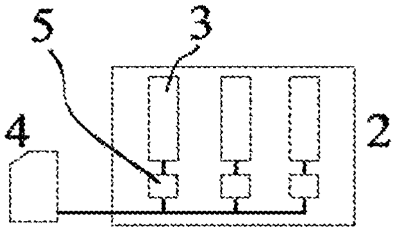
FIG. 5 provides a detail of a portion of FIG. 1.

With reference to FIG. 1, a computer network system and architecture is overall reported which is based on a machine 2 (represented in detail in FIG. 5) for crushing glass that is connected online, since it is provided with a SIM 4 card for communications over public telephone network 6; also the trucks 12 for the collection are connected online, such trucks being followed through satellite detection 7.

The machine 2 is equipped with sensors 5 connected to an electronic circuit board which, with dedicated detectors, count the bottles ground in each bucket 3. By storing the accounting of the n full buckets that the machine 2 has produced from the start of its operation, information is obtained for the central server 1 regarding which machines must be unloaded. An "App" is configured for providing all the information through a remote device. Indeed, the remote control of management of the machine 2 is connected to the SIM 4, which notifies the collection station 1 so that it provides for the substitution of the full trash containers 3 in time.

The apparatus 2 is provided with an automatic starting control with activation through a sensor placed on the bottle insertion door. In addition, the machine is provided with a screen that determines the maximum grain size that one wishes to obtain from the glass grinding, and this simplifies the processing of sand. Said screen is divided into three sections mounted on hinges openable by the same primary user, in order to facilitate the maintenance and cleaning thereof. It can in fact happen that an incorrect grinding leads to a blocking of the hammers, the unblocking occurring through the opening of the screen, which allows the exit of stuck material and the restoration of the operation. An inverter manages the operation of the motor in opposite sense, upon command, so as to allow a more facilitated control of the machine.

The machine 2, depending on the version and on the field of use for which it is intended, has an optical reader that recognizes the color of glass introduced and aims the ground glass into different containers $\mathbf{3}_1$, $\mathbf{3}_2$, . . . $\mathbf{3}_p$ through a "carousel" device lying beneath the grinding chamber. The differentiation by color gives added value to the product which has various applications on the market, and has its greatest application in ecological disposal areas, in medium-large size companies and/or plants.

As stated above, the machine 2 is provided with a system of load cells 3 which determine the weight of processed glass (25 Kg as by law), automatically blocking the introduction of new glass cases while awaiting the substitution of the collection bucket.

The machine 2 has on the buckets 3, made of transparent PVC, a calibration system per Kg of product; the bucket is identified with a bar code ID that attributes the origin thereto. In such a manner, at any time, the control center 1 knows the amounts of glass processed by each single user, and this allows administrators to better determine the attribution of the costs for management of the separate disposal collection and of the award aspects connected thereto, also creating the bases for market analysis aimed to implement the use of glass.

The apparatus is situated on trucks 12 dedicated for road collection, and the operator—once the vehicle is stopped—is capable, through slits situated on the perimeter faces of the means, of proceeding with the volumetric reduction of the collected glass packages by making a manual and/or automatic selection by color. Said means has, depending on the size thereof, a zone dedicated to the emptying, into the tank, of the buckets 3 coming from the door-to-door collection. Such means 12, due in fact to their versatility and to the type of material transported, contribute to lowering the acoustic pollution caused by current compactors.

The glass sand thus collected is sent to a dedicated plant 8 where it is subjected to the abovementioned screening and cleaning treatments. It should be stated that currently such plants do not exist in Italy, since the few plants that produce glass sand use discard material obtained from the preprocessing of the glass fractions in the authorized platforms; such discards also contain variable percentages of porcelain and crystal, and such sand is micronized through grinding mills which determine a single maximum grain size for the reuse in glassworks. The originality of the described finding lies in the different grain size that, upstream of each industrial process, is obtained from using the apparatus, and such grain size diversity ensures that in the industrial separation treatment thereof screens are applied with the size that one wishes to obtain in order to direct the product to different application fields and, depending on their specificity, they can be further treated with washing and/or thermal systems such to lower the COD level well below the reference parameters, until a product is obtained that is entirely free of bacteriological agents.

The sand is unloaded at the company 8, by the trucks 12, on a vibrating belt that, at low speed, brings the material into a hopper; this preloading step serves to visually check the contents of the unloaded bucket in order to verify that bodies extraneous to the collection are not found at its interior, and in case of detection of material extraneous to glass it is possible to trace back to the waste producer through the bar code reported on the bucket. The material, through conveyor belts, is sent to ferrous and non-ferrous material selectors, it traverses a vibrating fluid bed with hot air induction and suction-depulverization system such to eliminate the residual moisture and the paper parts of the labels, and subsequently the material is brought into a vibrating-sieve with different sections, where the selection of the desired grain sizes occurs. The subsequent step is that of treating the already-separated material in order to lower the COD, said step executed by washing if the material does not require particular attention and/or with thermal treatment, through a calcination device that by adjusting the temperature up to 700 degrees ensures that the final product is free of bacteria. The subsequent step is that of packaging the sand, which can be placed on the market in big bags and/or sacks of various piece size.

Such solution overall facilitates the application of a new technology adapted to support and substitute, where possible, the current supply chain of separate collection of glass. In this embodiment, profit optimization through exaggerated robotization of a system was not considered—i.e. compactors with automation systems for the collection and the emptying of the roadside containers, which is complex and quite costly—rather, a territorial redistribution of the single specificities by the user of the machine was considered. The apparatus, due in fact to its ductility characteristics, can be have wide circulation both in the HORECA sector and in the private sector, by the operator assigned for collection who can even possess the Italian B driving license since the collection, above all in large city centers, can be made with medium-capacity trucks 12, even and above all ecological vehicles, and in such a manner the operators are increased, the size and relative pollution due to the use of heavy vehicles is decreased, the acoustic pollution due to the glass spilling as currently conceived is eliminated, the times for the glass collection are extended since the minimum bulk of the buckets allows a stacking thereof at the place of production.

In a preferred embodiment of the invention, the problem relative to the transmission of the geolocation data of a plurality of glass collection points $\mathbf{2}_1$, $\mathbf{2}_2$, . . . $\mathbf{2}_n$ is resolved, since starting from these the detections are automatically collected by the central server 1 and are then retransmitted as geolocation data towards a further plurality of trucks $12_1$, $12_2$, $12_q$, with medium capacity, at the time of reception by the central server unit 1 of a given update request for the filling of the single cells 3 of the apparatuses 2. In practice, the control center 1 periodically sends a screen in 9⁄13 inch format (since this is the most widespread video format) to the single trucks 12 in order to update them regarding the distribution of glass to be collected throughout the territory.

In substance, a widespread transmission of the information regarding the filling of the baskets 3 comes to be created. Indeed it is evident that the central server 1 accomplishes the task of automatically transmitting said information regarding the filling of the baskets towards the display arranged on the truck or on the smartphone—by means of App—possessed by the driver.

More in detail, by means of the user interface constituted by the portable electronic device, the request of transmission of geolocation data of a plurality of apparatuses $2_1$, $2_2$, . . . $2_n$ and relative collection baskets $3_1$, $3_2$, . . . $3_p$ is executed. The step of transmission request is automatically generated by the central server unit 1, with the retransmission of said geolocation data, on the map 10, towards a plurality of viewers upon reception by the central server unit of update data for the proximity map 10 regarding the sites at which the collection is operated.

On the other hand, all the information regarding the filling of the baskets serves for managing the classification of the various commercial partners and also serves in detecting the "awards". Indeed, since it is possible to know the amounts of glass processed by each single user, it will be ensured that the administrators can best determine the attribution of the costs of management of the separate collection and awards connected thereto, creating the bases for market analyses also aimed to implement the use of glass.

With regard to another aspect, the system is seen as an infrastructure comprising:

n sites 2', 2" . . . $2^n$ at which the collections are carried out, q trucks 12', 12" . . . $12^q$;

a central control system 1 with relative data bank 14 of the recipient clients/plants; and p plants 8 which require the glass supply with particular specifications, such as different grain sizes, different colors of crushed glass, etc.

This comes to be configured as a self-regulating system on the basis of a series of feedbacks which produce, in real time, ready information regarding the collection of the type of glass at the time most requested by the recipient plant 8.

At the same time, the central system 1 is capable of accounting for the filling level of the single bucket 3', 3" . . . $3^m$, so as to establish the priority emptying of the same.

Figure 2:
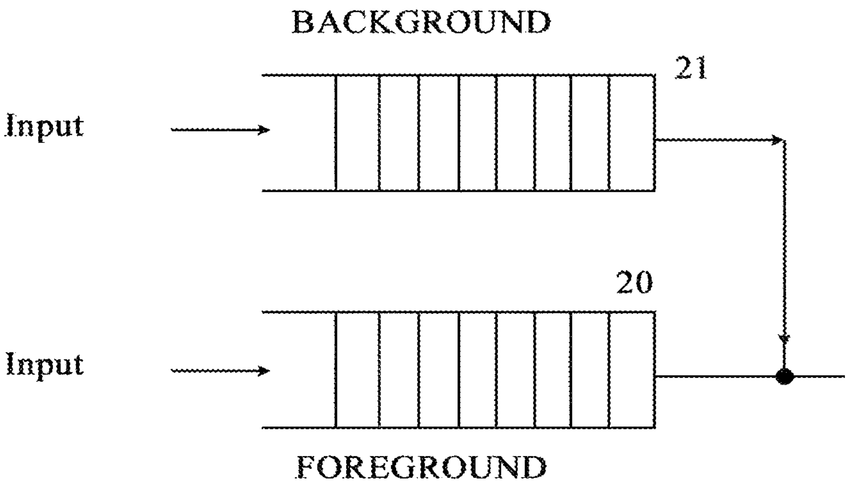
FIGS. 2 and 3 are schematic representations of the queues for implementing the priority criteria in the glass collection.

In substance, all the network architecture operates on a system of queues 9. In particular, it is based on a queue base foreground 20-background 21 as reported in FIG. 2.

According to a first operating solution, the queue foreground 20 has priority over that of background 21, in which the unloading is inserted that must be carried out when it has a specific glass characteristic, to be detected. In other words, that the processes of unloading of the queue background 21 are only attended to if the queue foreground 20 is empty.

Figure 3:
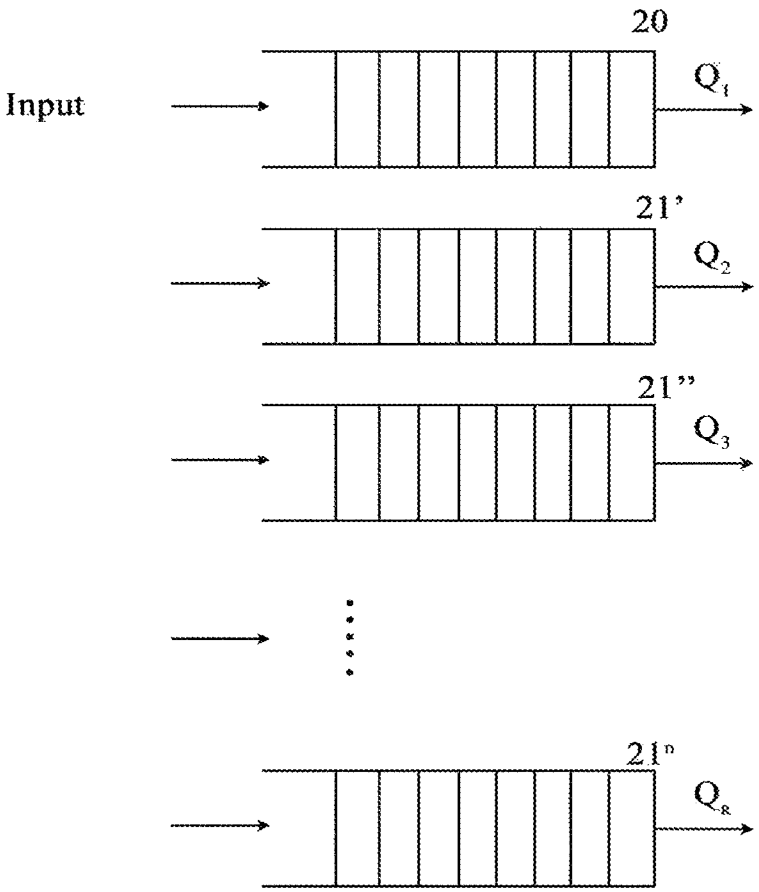

More often, an implementation of multilevel feedback type is considered, as in FIG. 3 which constitutes a generalization of that just described.

The queue 20 of the level 1 corresponds with the queue foreground and has the maximum priority of being attended to. Then there are other processes that fall within other queues of lower priority, as reported in FIG. 3, receiving a subordinate priority.

If the processes comprised in the queue with maximum priority 20 are completed, then the processes of the queue 21', then of 21", then of 21'" etc. are attended to.

The first priority queue 20 is that which produces a path that favors the sites in which the generic cell 3 is filled. Next, the established path considers the specific requests of the single recipient plant 8, which may need a certain type of glass (e.g. from the standpoint of the grain size 21', and/or of the color 21" . . . ) and not other types. Hence, for example the trucks 12, based on availability of a series of full cells, first access only those sites 2 at which it is certain that crushed glass of such type can be detected.

In practice, if the request to provide the plant 8 with green color glass has become a priority, the IDs of the machines 2 at which the cells 3 in charge of the green glass collection are filled (or are about to be filled) will be moved in the queue foreground. Depending on the priority, it is even possible to move into the queue background those cell IDs which—even if full—at the moment are not of the requested color. In fact, as stated above the machine 2 is provided with a system of load cells 3 which determine the weight of processed glass (25 Kg as by law), automatically blocking the introduction of new glass cases while awaiting the substitution of the collection bucket.

It is clear that such virtualization of the paths and of the access queues can be repeated over multiple levels (FIG. 3), remaining within the basic principle of a management with virtual queue.

It is also evident that the operating conditions are extremely effective from the standpoint of the times with which the unloading of the single cells 3 is carried out.

The communication by means of public telephone network 6 of the weight/number of bottles, in each cell 3 of the apparatus 2, ensures that the control center 1 has instantaneous knowledge of the glass loaded in each cell $3^1$, $3^2$, . . . $3^p$ of each machine 2 distributed throughout the territory.

At the same time, the GPS detection of the current position of the truck $12^1$, $12^2$ . . . $12^q$ ensures that an optimal path can be generated based on the most recent requests coming from the plant 8 that requires a single supply with a particular glass.

Figure 4:
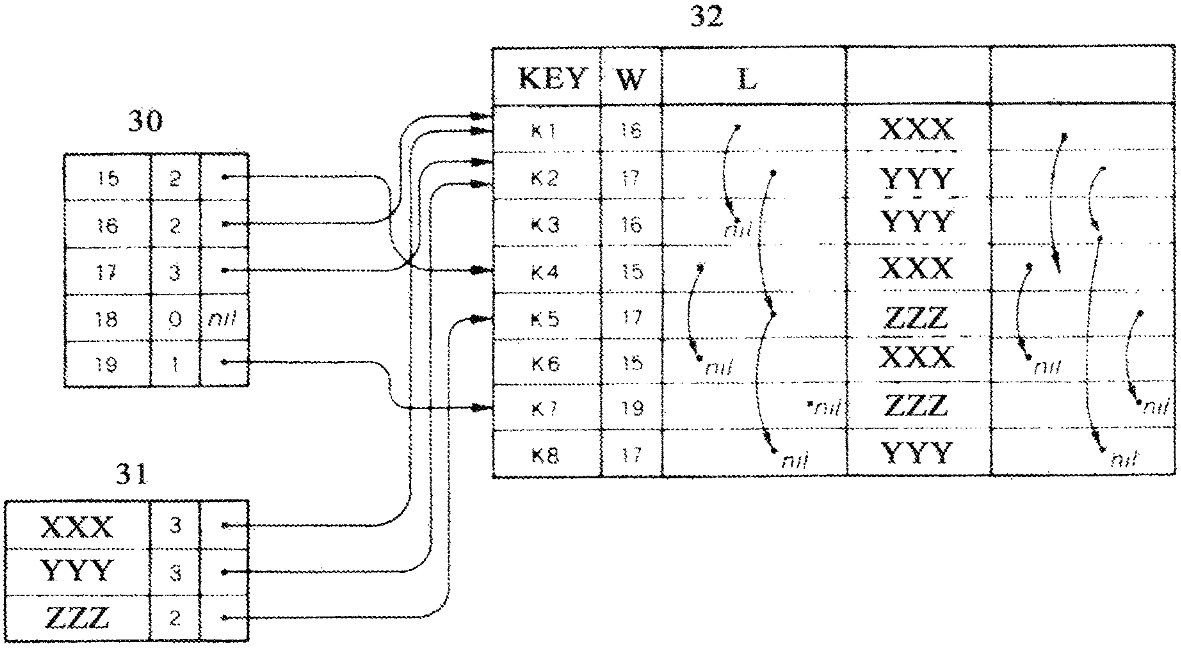
FIG. 4 is a representation of a multiple list organization for the selection of the sites at which the collection is carried out in a priority mode.

A further possibility of management of the different priority types is provided by a multiple list organization of the type reported in FIG. 4, which can be accessed through a secondary key—e.g. glass color. In the first column of the table 30, there are the weights of the single cells, in the second column the number of cells associated with a certain weight of the cell, the table 32 coming to represent the primary archive. In table 31, the three color types XXX, YYY, ZZZ are also reported, with the relative pointers at the head of the list. The idea is to bind together in a concatenate list all the recordings that have the same as the secondary key. In this context, different types of compound queries can be effectively and immediately satisfied; for example: how many Kg of white glass are currently available and which are the sites where they can be loaded?

In a further embodiment of the present invention, the glass collection management and control server 1 operates by also accounting for, in real time, the pick-ups made of glassy material at the very moment when the loading occurs from the single cell 3 to the truck 12. For such purpose, weight sensors 5 are provided that are located both at each bucket 3—at each section of the collection machine 2, a weight sensor 5 is provided—and on board the truck 12 charged for the collection. In substance, at the time of the loading on the truck, the central system 1 records, in a computer mode— simultaneously—a decrease of weight in the set of collection baskets 3 and simultaneously an increase of the load on the truck 12.

From the strictly manufacturing standpoint, one or more SIM 4 at the collection site 2 are connected to a device for detecting the weights of the single baskets 3, or the number of bottles, which have been inserted in the single containment apparatus/basket 2, 3. In fact, at the central system 1, a data bank 14 of the various users and of the relative containers/buckets 2, 3 stores, in real time, how much glass has been loaded in each bucket 3. A picture is therefore available regarding the distribution of the glass loads over a specific territory.

At the time of passage of the truck 12, the baskets are unloaded and then the weight sensors 5 are themselves set to detect the emptying and to communicate it to the central system 1.

A system for detecting the weights is also present on the truck 12 (e.g. through a device which evaluates the different degree of damping of the oscillations, by the shock absorbers, due to the increased/decreased load). In this case, there is the possibility on one hand:

to check the actual unloading of the bucket 3 on the truck 12;

and at the same time to monitor the unloading from the truck 12 to a final recipient 8 of the product to be delivered.

If on one hand the same central server 1 supplies a graph regarding the paths to be followed for the glass loading, it is important that the human factor also be considered, so that each time a certain graph is configured it is the same driver of the truck 12 who inserts an indication of the path he/she prefers at that moment, notwithstanding the existence of an "objective" classification based on the information regarding the filling of the baskets 3 compiled by the central server 1.

The driver of the truck 12 himself/herself takes care to select—from among the various locations—those which are most convenient beyond the classification enacted by the central server 1. In this manner, he/she manages a geographic map 10 of interest, with the sites of easiest access highlighted. In substance, he/she could for example discard a site 2 with the maximum filling of the baskets 3 and consider a lower-priority site in the classification for his/her own present grounds (momentary inaccessibility, car accident, parade/protest, municipal street cleaning and refusal disposal vehicle or truck, traffic therefore being slowed). Then the user is capable of creating a map or a physical geographic map 10 as desired, starting from classifications recommended through the information regarding the filling of the baskets 3, and he/she can thus modify, as desired, the same geographic map 10 on the screen. It is important that such path on the map 10—and the relative variations—be transmitted in real time to the server 1 in order to prevent that two trucks simultaneously go towards the same site 2.

In summary, periodically or on request, each driver receives a map 10 with pre-established paths. The same driver then has ample freedom in the selection, such driver in any case having an essential role in the manipulation of the different indicators regarding the emptying of the collection baskets 3 at each crushing apparatus 1. It is thus preferred to maintain a small level of automation in order to have the possibility for driver intervention, in a flexible manner.

In other words, beyond the techniques of automatic detection of the abovementioned map model, the present invention provides for a small degree of automation and the possibility that this type of evaluation is executed directly at the client. In particular, an essential principle of the invention is that of referring to a limited degree of automation in the use of the application SW which would provide the described optimized path to be followed.

In a preferred embodiment of the present invention, dedicated displays/maps are made. In particular, it is provided that the map be constituted by a semi-transparent upper paper layer. The geographic map of the sites is reported thereon, and below such upper layer a matrix is provided of micro-LEDs which are illuminated in relation to the path already completed by the motor vehicle.

An App is capable of providing information in order to be able to define an optimized route which is illuminated and which the driver can follow.

The results of the summation of the information regarding the filling of the baskets 3, at the sites 2 where the glass of a given color is found, are in turn indicated on the map itself with blinking lights, in turn controlled by the App itself. In other words, a series of business enterprises (or more in general entities) that fall within a particular program for the management of the information regarding the filling of the baskets 3 with glass of a given color, or of a given grain size, are indicated on the map device with LED illumination, as is moreover already known for various cartographic services provided on the web. It is extremely advantageous that the message regarding the availability of sites where to find glass of a specific color is dynamically provided. In fact, for example if the glass load of a given color has already been unloaded at a particular site, this is indicated by means of a blinking light activity in real time, based on the information regarding the filling of the recorded baskets.

Advantages and Industrial Applicability of the Finding

The described machine allows the operator to reduce the processed volumes down to a tenth, and to store them by means of PVC containers with 25 Kg capacity up to collection. The product fields to which the various grain sizes will be dedicated, in the various types of thermal processing and otherwise, will be the following: construction, paints, water filtering, bricolage, production of embankment-saving sacks, production of sand, as a non-limiting example for beach nourishment, thus avoiding harmful dredging works and/or quarrying works.

In addition to that stated above, the glass remains confined within a closed bucket up to its emptying at the specifically dedicated processing site, in order to underline that this system ensures that the glass doe not undergo contamination, as currently occurs. The factory processing of glass, its reuse in channels other than that of the foundry ensure that high-quality secondary raw material can be created, contributing to the making of a virtuous and ethical induced activity for the entire supply chain.

The advantageous solutions provided for the problems related to the glass transportation networks are evident, in relation to the delays that occur based on the travel route selection. The definition of a minimum network each time, based on the selections made by the user, can be acquired in real time by providing a route for connecting the sites with the machines 2 with the smallest possible length. Indeed, the finding is capable of establishing techniques for being able to minimize the paths and thus find the so-called minimum travel based on any one series of predetermined characteristics.

Finally, it is clear that additions, modifications and variations that are obvious for a man skilled in the art can be applied to the devices that are the object of the present invention, without departing from the protective scope provided by the enclosed claims.

The invention claimed is:

1. A method for managing requests for unloading crushed glass collected by glass crushing and collection machines distributed throughout a territory, the method comprising the following operating steps:

monitoring, by a control center, an availability of one or more different types of crushed glass at the collection machines, the collection machines in electronic communication with the control center, and each collection machine identifying to the control center one or more of said types of crushed glass stored respectively in one or more container cells of the collection machine;

receiving, at the control center, a request from a production plant for a type of crushed glass from among the one or more types of crushed glass;

processing, at the control center, an emptying request transmitted from a collection machine of the collection machines wherein one or more of the glass container cells has been filled, and updating paths provided to a fleet of transport vehicles to be followed by respective drivers of said transport vehicles for unloading glass material from the glass container cells, a transport vehicle being selected by the control center from among the fleet of transport vehicles to unload the glass material from the glass container cells of the collection machine based on one of the request from the production plant and a minimum travel criteria of the transport vehicle to the collection machine, each filled container cell being filled with crushed glass of a single type of crushed glass from among the one or more types of crushed glass;

loading glass contents from each filled container cell of the collection machine to the transport vehicle, thereby emptying each filled container cell of the collection machine to the transport vehicle;

updating, at the control center following the emptying of each filled container cell, a weight of each container cell emptied by the transport vehicle and a weight of glass contents loaded from the emptied container cells onto the transport vehicle;

upon reaching, on the transport vehicle, a given weight for a glass type requested by the production plant, transmitting, to the transport vehicle, map information for delivery of the glass contents of the requested type by the transport vehicle to the production plant; and delivering the glass contents of the requested type by the transport vehicle to the production plant.

2. The method according to claim 1, wherein the collection machines operate to produce and collect different grain sizes of the crushed glass.

3. The method according to claim 2, wherein the control center communicates with the collection machines, the production plant, and the transport vehicles via transmission of information over a public telecommunications network, the control center automatically transmitting information regarding the filled container cells to any of display systems arranged on the transport vehicles and smartphones of drivers of the transport vehicles.

4. The method according to claim 2, wherein the control center acquires and stores in real time a filling level of each container cell of each machine and establishes a priority emptying operation by means of a dynamic control using two or more queues.

5. The method according to claim 2, wherein weight sensors are arranged at each container cell of the collection machines, and control and management for glass collection from the collection machines performed by the control center takes into account, in real time, completed collection of glass material at the moment when the loading from any single container cell to the transport vehicle takes place, whereby the control center records a decrease of weight in the container cells and an increase of a glass load on the transport vehicle that empties the container cells.

6. The method according to claim 2, wherein when the transport vehicle accesses the collection machine, the container cells are unloaded, then weight sensors of the container cells detect the emptying, and digital information of the weight sensors is communicated from the collection machine to the control center via a public telecommunications network.

7. The method according to claim 1, wherein the collection machines are configured to distinguish colors of glass introduced therein to be crushed, and directs crushed glass of different colors into respective different container cells.

8. The method according to claim 7, wherein the control center communicates with the collection machines, the production plant, and the transport vehicles via transmission of information over a public telecommunications network, the control center automatically transmitting information regarding the filled container cells to any of display systems arranged on the transport vehicles and smartphones of drivers of the transport vehicles.

9. The method according to claim 7, wherein the control center acquires and stores in real time a filling level of each container cell of each machine and establishes a priority emptying operation by means of a dynamic control using two or more queues.

10. The method according to claim 7, wherein weight sensors are arranged at each container cell of the collection machines, and control and management for glass collection from the collection machines performed by the control center takes into account, in real time, completed collection of glass material at the moment when the loading from any single container cell to the transport vehicle takes place, whereby the control center records a decrease of weight in the container cells and an increase of a glass load on the transport vehicle that empties the container cells.

11. The method according to claim 1, wherein the control center communicates with the collection machines, the production plant, and the transport vehicles via transmission of information over a public telecommunications network, the control center automatically transmitting information regarding the filled container cells to any of display systems arranged on the transport vehicles and smartphones of drivers of the transport vehicles.

12. The method according to claim 11, wherein the control center acquires and stores in real time a filling level of each container cell of each machine and establishes a priority emptying operation by means of a dynamic control using two or more queues.

13. The method according to claim 11, wherein weight sensors are arranged at each container cell of the collection machines, and control and management for glass collection from the collection machines performed by the control center takes into account, in real time, completed collection of glass material at the moment when the loading from any single container cell to the transport vehicle takes place, whereby the control center records a decrease of weight in the container cells and an increase of a glass load on the transport vehicle that empties the container cells.

14. The method according to claim 1, wherein the control center acquires and stores in real time a filling level of each container cell of each machine and establishes a priority emptying operation by means of a dynamic control using two or more queues.

15. The method according to claim 14, wherein weight sensors are arranged at each container cell of the collection machines, and control and management for glass collection from the collection machines performed by the control center takes into account, in real time, completed collection of glass material at the moment when the loading from any single container cell to the transport vehicle takes place, whereby the control center records a decrease of weight in the container cells and an increase of a glass load on the transport vehicle that empties the container cells.

16. The method according to claim 1, wherein weight sensors are arranged at each container cell of the collection machines, and control and management for glass collection from the collection machines performed by the control center takes into account, in real time, completed collection of glass material at the moment when the loading from any single container cell to the transport vehicle takes place, whereby the control center records a decrease of weight in the container cells and an increase of a glass load on the transport vehicle that empties the container cells.

17. The method according to claim 1, wherein when the transport vehicle accesses the collection machine, the container cells are unloaded, then weight sensors of the container cells detect the emptying, and digital information of the weight sensors is communicated from the collection machine to the control center via a public telecommunications network.

18. The method according to claim 1, wherein each collection machine is equipped with one or more Subscriber Identity Module (SIMs) connected to one of a device for detecting glass weights of the container cells and a device that counts a number of bottles put into a containment of the collection machine, and wherein the control center includes a data bank that stores, in real time, data regarding the amount of glass loaded in each container cell.

19. The method according to claim 1, wherein weights are detected on the transport vehicle by means of sensing devices which evaluate a degree of damping of oscillations of the transport vehicle by shock absorbers of the transport vehicle, and the control center uses data of said detected weights to:

check an unloading of glass content from the container cells onto the transport vehicle; and monitor an unloading from the transport vehicle to plant.

* * * * *